(12) United States Patent
Edlund (10) Patent No.: US 11,712,006 B2
(45) Date of Patent: Aug. 1, 2023

(54) GRAIN DRYING DEVICE (71) Applicant: LeRoy Edlund, Cyrus, MN (US)

(72) Inventor: LeRoy Edlund, Cyrus, MN (US)

( * ) Notice: Subject to any disclaimer, the term of this patent is extended or adjusted under 35 U.S.C. 154(b) by 575 days.

(21) Appl. No.: 16/924,384

(22) Filed: Jul. 9, 2020

(65) Prior Publication Data

US 2020/0383273 A1 Dec. 10, 2020

Related U.S. Application Data

(63) Continuation-in-part of application No. 16/431,404, filed on Jun. 4, 2019, now Pat. No. 11,098,952.

(51) Int. Cl.
*A01F 25/08* (2006.01)
*F26B 9/10* (2006.01)

(52) U.S. Cl.
CPC ............ *A01F 25/08* (2013.01); *F26B 9/103* (2013.01); *F26B 2200/06* (2013.01)

(58) Field of Classification Search
CPC ...... F26B 21/06; F26B 9/063; F26B 17/1425; F26B 9/103; F26B 2200/06; F26B 3/06; F26B 17/124; F26B 17/00; F26B 3/02; A01F 25/22; A01F 25/08; A01F 25/00; B65D 88/742
See application file for complete search history.

(56) References Cited

U.S. PATENT DOCUMENTS

| | | | | |
|---|---|---|---|---|
| 100,628 A | * | 3/1870 | Hoffmann | B65D 88/742 34/507 |
| 501,116 A | * | 7/1893 | Towel | B65D 88/742 34/232 |
| 722,118 A | * | 3/1903 | Liles | B65D 88/742 454/178 |
| 1,102,714 A | * | 7/1914 | Bornmann | F26B 9/063 34/174 |
| 1,119,941 A | * | 12/1914 | Louks | B65D 88/742 454/177 |
| 1,522,186 A | * | 1/1925 | Hiestand | B65D 88/742 454/177 |
| 1,660,555 A | * | 2/1928 | Gentslinger | F26B 9/103 454/182 |
| 2,000,102 A | * | 5/1935 | Shodron | A01F 25/08 454/178 |
| 2,000,103 A | * | 5/1935 | Shodron | F26B 21/04 454/181 |
| 2,645,991 A | * | 7/1953 | Hobson | B65D 88/742 454/178 |
| 2,818,009 A | * | 12/1957 | Steffen | B65D 88/742 52/302.2 |

(Continued)

*Primary Examiner* — David J Laux
*Assistant Examiner* — Bao D Nguyen (57) ABSTRACT

A grain aeration system facilitates thorough and efficient aeration of grain within a grain bin. The system includes a grain bin having a top vent and a bottom vent. A stand is positioned within the grain bin. A duct includes a loop section supported on the stand and an extension extending from the loop section out through the bottom vent in the grain bin. The duct has a duct wall and a plurality of perforations extending through the duct wall. A blower drives air flow out of the bottom vent creating air flow into the grain bin through the top vent and into the duct wherein the blower is configured to aerate grain positioned within the grain bin.

20 Claims, 9 Drawing Sheets

(56) References Cited

U.S. PATENT DOCUMENTS

| | | | | | |
|---|---|---|---|---|---|
| 2,856,838 | A | * | 10/1958 | Mack | B65D 88/742 454/181 |
| 2,929,154 | A | * | 3/1960 | Finnegan | F26B 5/04 34/92 |
| 3,041,684 | A | * | 7/1962 | Dawson | B65D 88/742 422/292 |
| 3,196,774 | A | * | 7/1965 | Kripal | B65D 88/742 454/178 |
| 3,199,434 | A | * | 8/1965 | Piel | B65D 88/742 34/174 |
| 3,217,424 | A | * | 11/1965 | Johnson | F26B 21/08 34/89 |
| 3,265,225 | A | * | 8/1966 | Louks | B65G 69/00 414/302 |
| 3,333,348 | A | * | 8/1967 | Ausherman | F26B 17/124 34/174 |
| 3,416,239 | A | * | 12/1968 | Louks | F26B 25/002 34/211 |
| 3,426,445 | A | * | 2/1969 | Steffen | B65D 88/742 52/192 |
| 3,479,748 | A | * | 11/1969 | Sietmann | F26B 9/063 34/174 |
| 3,512,322 | A | * | 5/1970 | Steffen | B65D 88/742 52/690 |
| 3,531,874 | A | * | 10/1970 | Sukup | F26B 9/103 454/182 |
| 3,532,232 | A | * | 10/1970 | Sukup | A01F 25/20 414/287 |
| 3,563,399 | A | * | 2/1971 | Shivers | F26B 9/085 366/147 |
| 3,591,994 | A | * | 7/1971 | Steffen | B65D 88/742 52/302.2 |
| RE27,573 | E | * | 2/1973 | Kucera | F26B 17/124 34/174 |
| 3,714,718 | A | * | 2/1973 | Sukup | F26B 9/063 34/573 |
| 3,727,556 | A | * | 4/1973 | Adams | F26B 9/085 366/147 |
| 3,982,329 | A | * | 9/1976 | Dougherty | F26B 3/06 34/233 |
| 4,009,520 | A | * | 3/1977 | Sukup | F26B 9/103 34/233 |
| 4,077,134 | A | * | 3/1978 | Steffen | F26B 9/103 34/443 |
| 4,137,682 | A | * | 2/1979 | Trumper | F26B 25/10 52/302.3 |
| 4,142,302 | A | * | 3/1979 | Primus | F26B 23/007 34/212 |
| 4,282,694 | A | * | 8/1981 | Mead | B65D 88/742 52/192 |
| 4,306,490 | A | * | 12/1981 | Kallestad | F26B 9/103 34/233 |
| RE31,368 | E | * | 9/1983 | Trumper | B65D 88/742 52/302.2 |
| 5,604,996 | A | * | 2/1997 | Bestwick | F26B 9/063 73/863.52 |
| 6,073,364 | A | * | 6/2000 | McKenzie | F26B 25/002 34/166 |
| 8,720,079 | B2 | | 5/2014 | Neufeld | |
| 8,875,412 | B1 | * | 11/2014 | Anderson | F26B 9/063 34/174 |
| 10,766,719 | B2 | * | 9/2020 | Genovese | B65G 65/463 |
| 2007/0234587 | A1 | * | 10/2007 | Pierson | F26B 9/103 34/174 |
| 2009/0094853 | A1 | * | 4/2009 | Noyes | F26B 9/103 34/232 |
| 2012/0047762 | A1 | * | 3/2012 | Neufeld | F26B 17/1425 29/428 |
| 2012/0102776 | A1 | * | 5/2012 | Varro | F26B 25/10 29/401.1 |
| 2013/0295833 | A1 | * | 11/2013 | Thiessen | B65D 88/742 454/178 |
| 2013/0333234 | A1 | * | 12/2013 | Hartsook | A23B 9/08 34/232 |
| 2019/0021232 | A1 | * | 1/2019 | Comte | A01F 25/22 |
| 2019/0329971 | A1 | * | 10/2019 | Siemens | F26B 25/10 |
| 2020/0031571 | A1 | * | 1/2020 | Rosumowitsch | B65D 88/72 |

\* cited by examiner

GRAIN DRYING DEVICE

CROSS-REFERENCE TO RELATED APPLICATIONS

This application is a continuation in part and claims the benefit under 35 U.S.C., Section 120 of pending U.S. application Ser. No. 16/431,404 filed Jun. 4, 2019.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to grain aeration systems and more particularly pertains to a new grain aeration system for facilitating thorough, even, and efficient aeration of grain within a grain bin without forming pockets of moisture within the grain bin and leaving at least a center portion, if not an entirety, of the floor of the grain bin unobstructed.

(2) Description of Related Art Including Information Disclosed Under 37 CFR 1.97 and 1.98

The prior art relates to grain aeration systems. The prior art known fails to provide for a statically supported aeration duct positioned centered over a floor of a grain bin while leaving either the center portion of the floor or the entirety of the floor unobstructed by the duct supporting structure.

BRIEF SUMMARY OF THE INVENTION

An embodiment of the disclosure meets the needs presented above by generally comprising a grain bin having a top vent and a bottom vent. A stand extends through the grain bin spaced above a floor of the grain bin. The stand is supported either at the periphery of the floor of the grain bin only or the stand extends through the grain bin to be supported outside of the grain bin leaving the floor of the grain bin fully unobstructed by the stand. A duct has a main section supported on the stand and an extension extending from the main section out through the bottom vent in the grain bin. The duct includes a duct wall having a plurality of perforations for air to pass through the duct wall. A blower drives air flow out of the grain bin through the bottom vent creating air flow into the grain bin through the top vent and into the duct to aerate grain positioned within the grain bin.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 10 thereof, a new grain aeration system embodying the principles and concepts of an embodiment of the disclosure and generally designated by the reference numeral 10 will be described.

Figure 8:
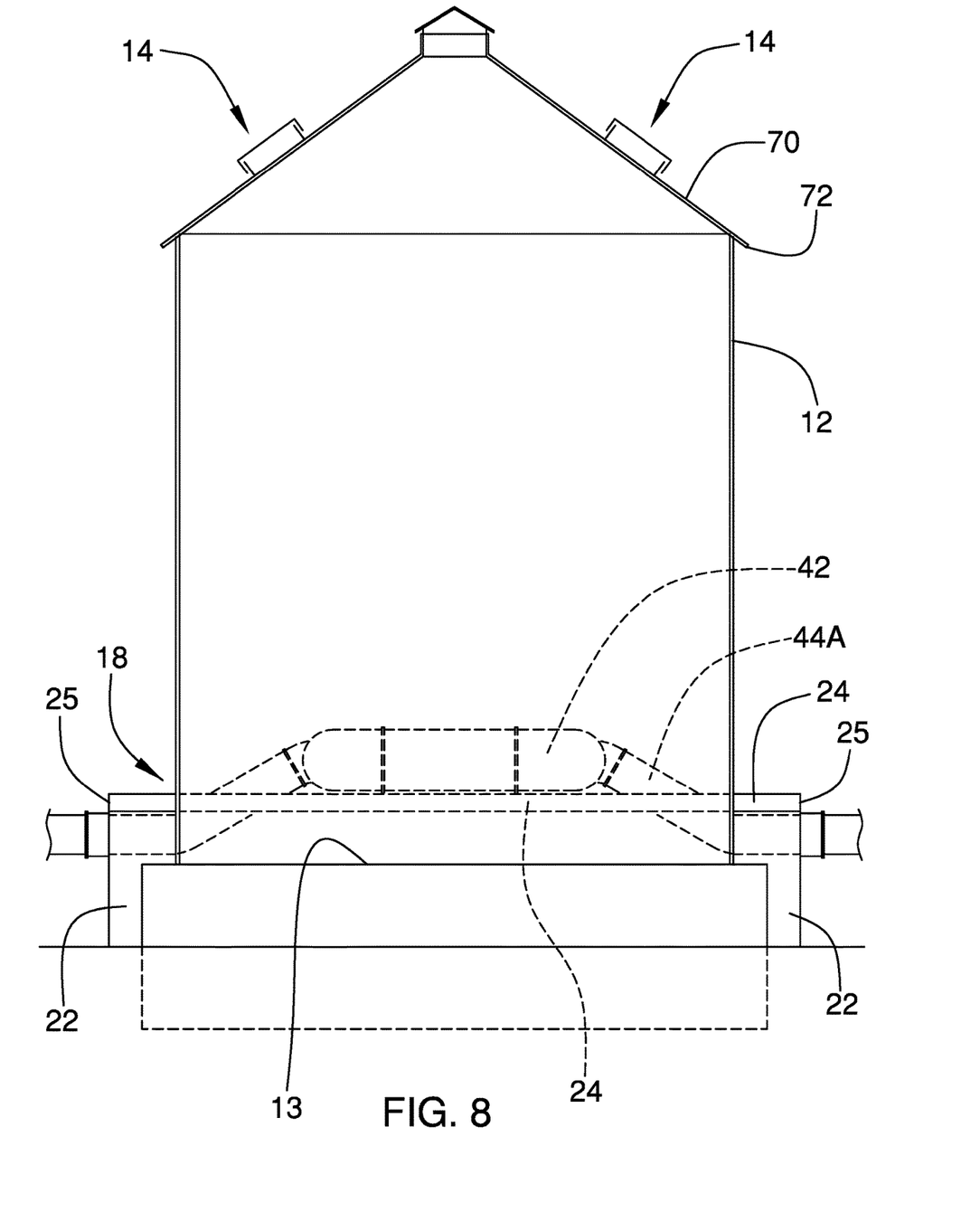
FIG. 8 is a front view of the alternative leg for the support stand of an embodiment of the disclosure in a pivoted position.

As best illustrated in FIGS. 1 through 10, an embodiment of the grain aeration system 10 generally comprises a grain bin 12 of generally conventional structure having a top vent 14 and a bottom vent 16. For purposes of this detailed description the dimensions are based on a grain bin 12 having an interior diameter of approximately 30 feet. Further, the top vent 14 is shown at an apex of the grain bin 12. However, the top vent 14 may be alternatively positioned in the roof structure 70 between the apex and a peripheral edge 72 of the roof structure 70, as shown in FIG. 8. For purposes of the invention herein, the top vent 14 need be at a position above the level of grain within the grain bin 12 when the grain bin 12 is filled to capacity. Similarly, the bottom vent 16 may have alternative positions as shown in the drawing figures and discussed in more detail below.

In an embodiment shown in FIGS. 1 through 7, a stand 18 is positioned within the grain bin 12. The stand 18 is spaced between three feet and five feet above a floor 13 of the grain bin 12. The stand 18 includes a plurality of legs 22 with each of the legs 22 being positioned at one of a pair of opposing ends 25 of the stand 18. The stand 18 comprises a plurality of beams 24 which are each straight and extend across the grain bin 12. Each of the beams may have a width between 3 and 7 inches and may be specifically 5 inches in width. Each leg 22 is positioned at a periphery 26 of the floor 13 of the grain bin 12 such that the beams 24 are supported spaced over a center portion 15 of the floor 13 of the grain bin 12. This leaves the center portion 15 of the floor 13 of the grain bin 12 unobstructed. The beams 24 may be provided as a pair of beams 24 positioned parallel to each other with each being supported by a pair of the legs 22.

Figure 9:
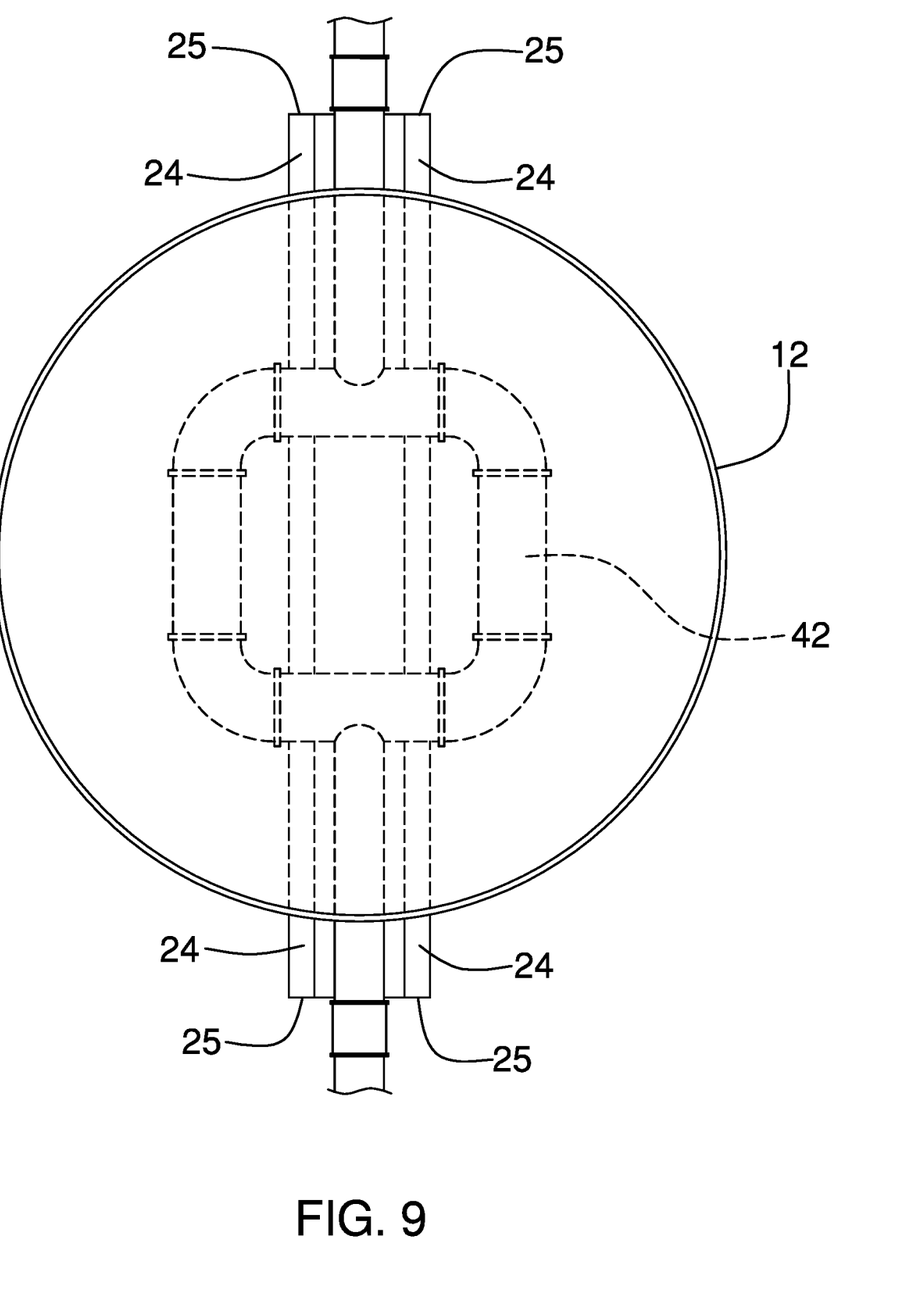
FIG. 9 is a partial cut-away front view of an embodiment of the disclosure.

The legs 22 are spaced sufficiently to have a radially oriented grain sweep 32 positioned extending outwardly from a center of the floor 13 but stopping short of the legs 22 to allow for full rotation of the grain sweep 32 around the center portion of the floor 13 without obstruction. Alternatively, as shown in FIGS. 8 and 9, the legs 22 are positioned outside of an interior 17 of the grain bin 12 with the beams 24 extending fully through the grain bin 12. This leaves the full extent of the floor 13 of the grain bin 12 unobstructed.

Figure 1:
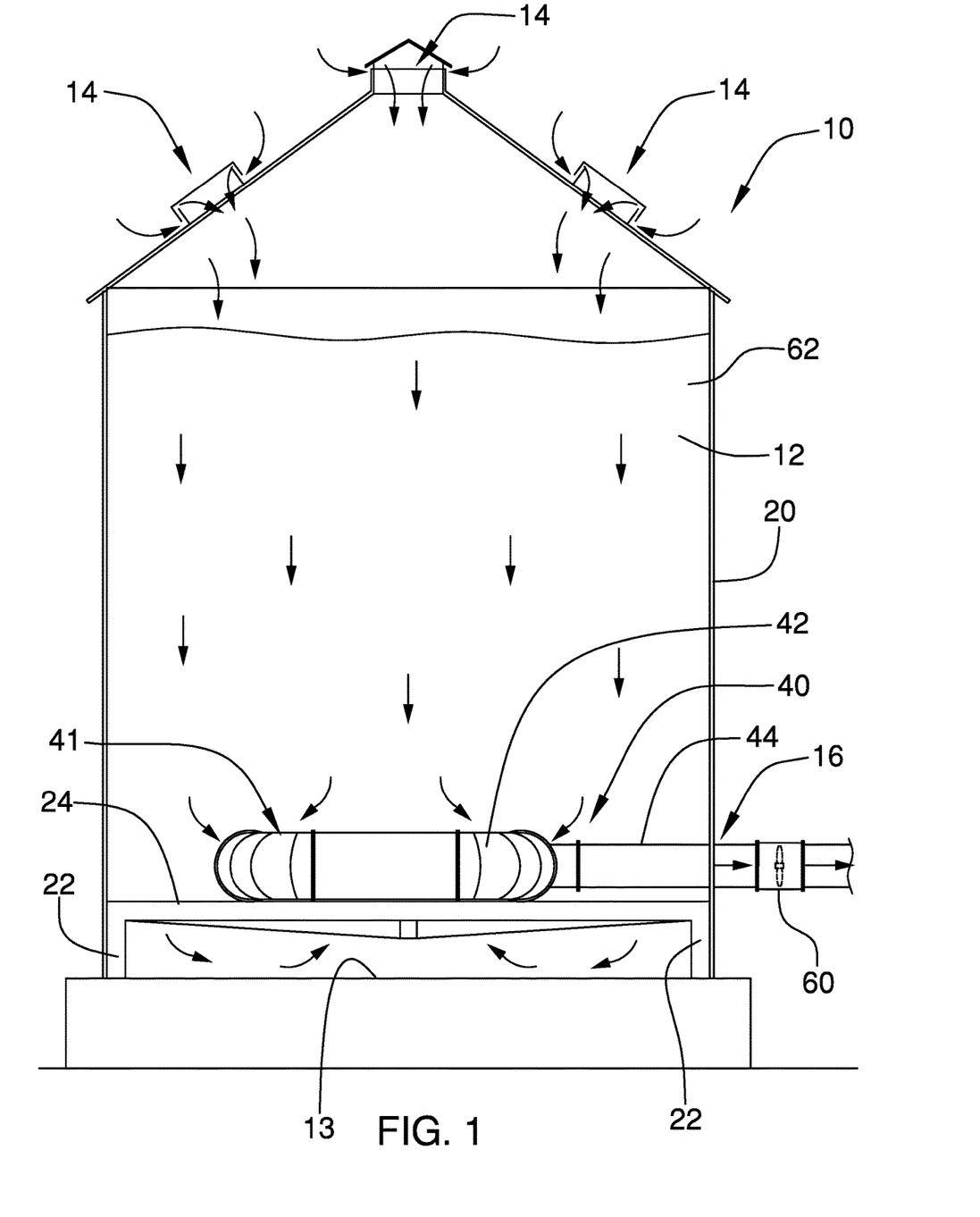
FIG. 1 is a front partial cut-away view of a grain aeration system according to an embodiment of the disclosure.
Figures 2, 3:
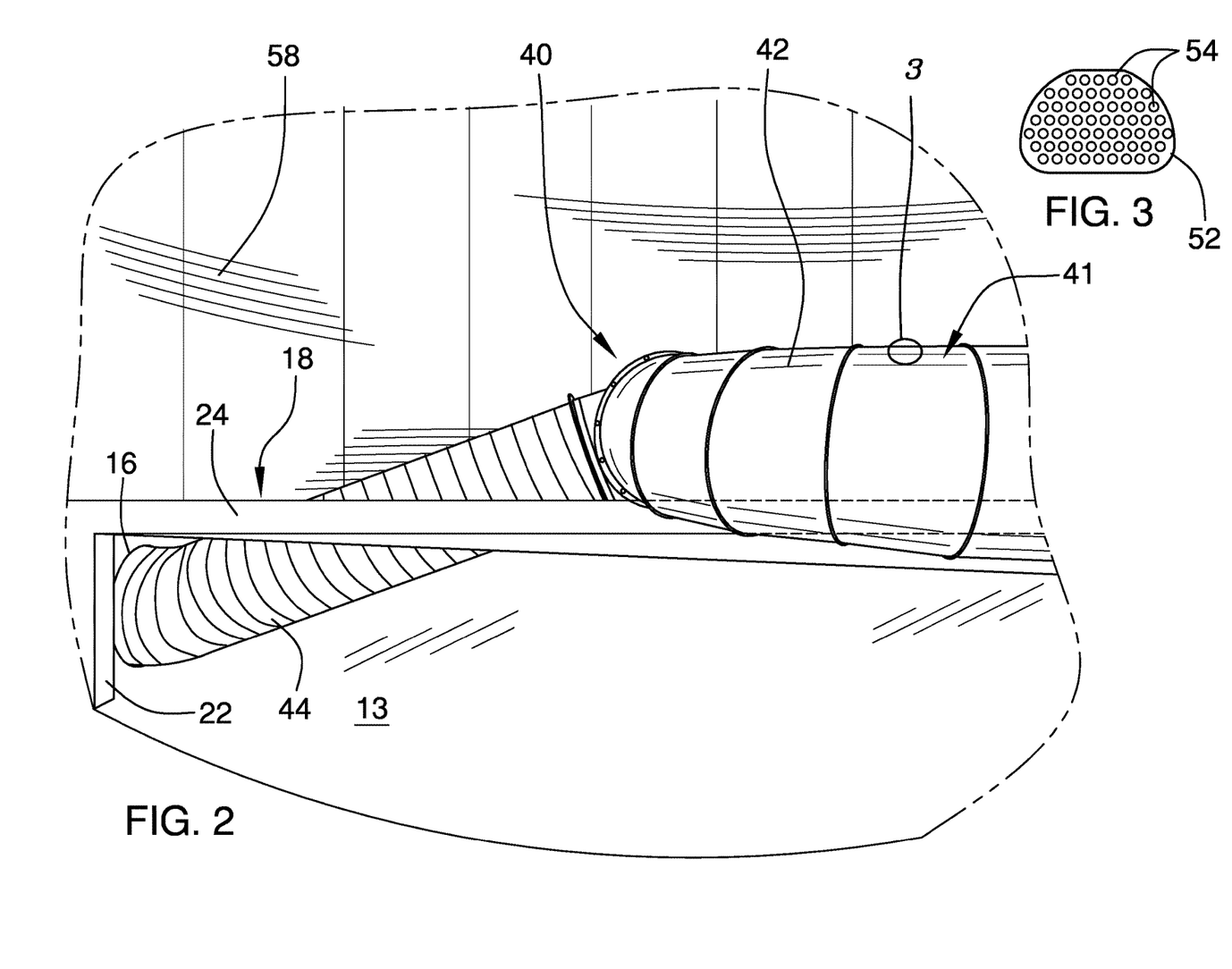
FIG. 2 is a partial rear view of an embodiment of the disclosure.
FIG. 3 is a detailed view of the section indicated in FIG. 2.
Figure 4:
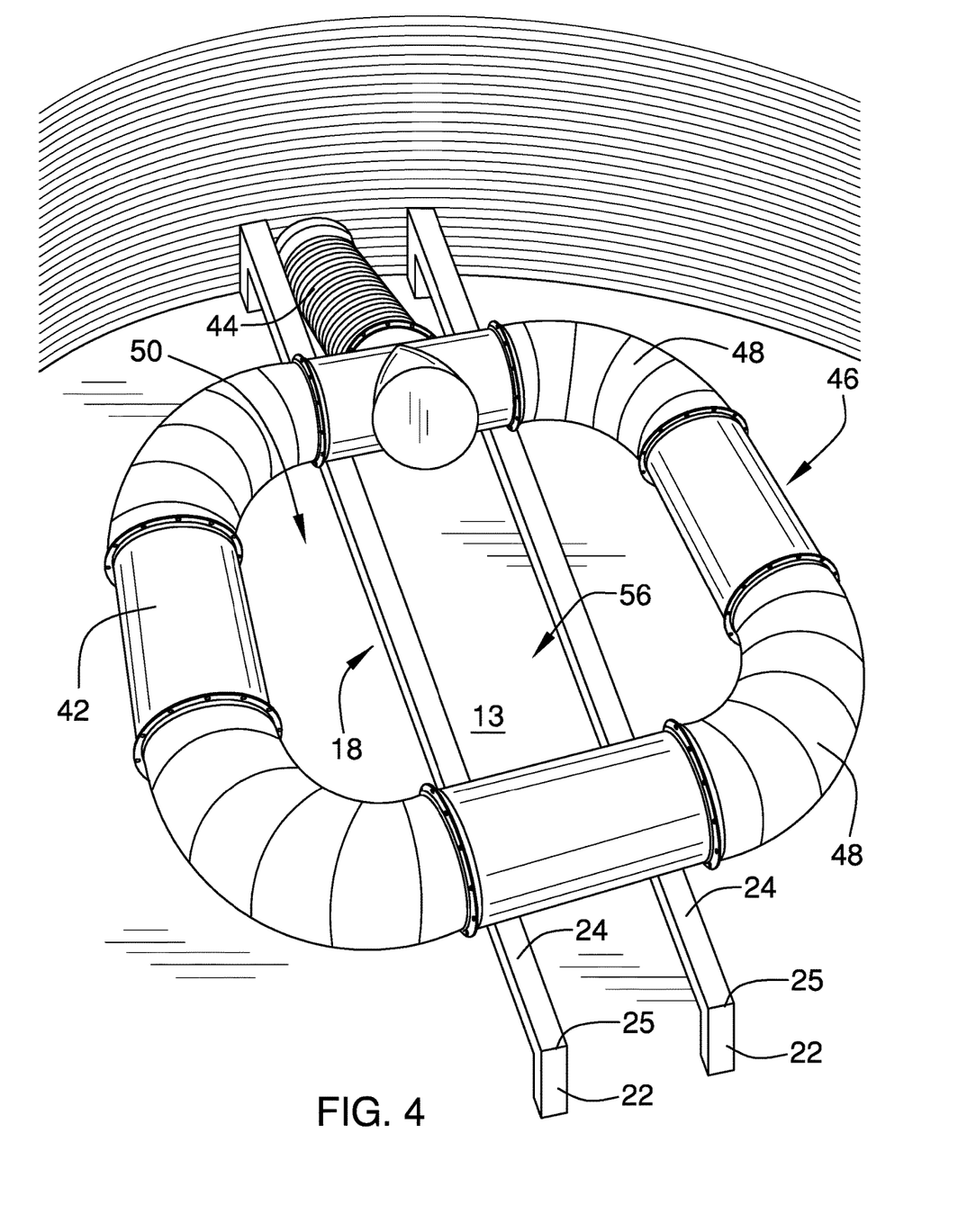
FIG. 4 is a top side perspective view of an embodiment of the disclosure.
Figure 5:
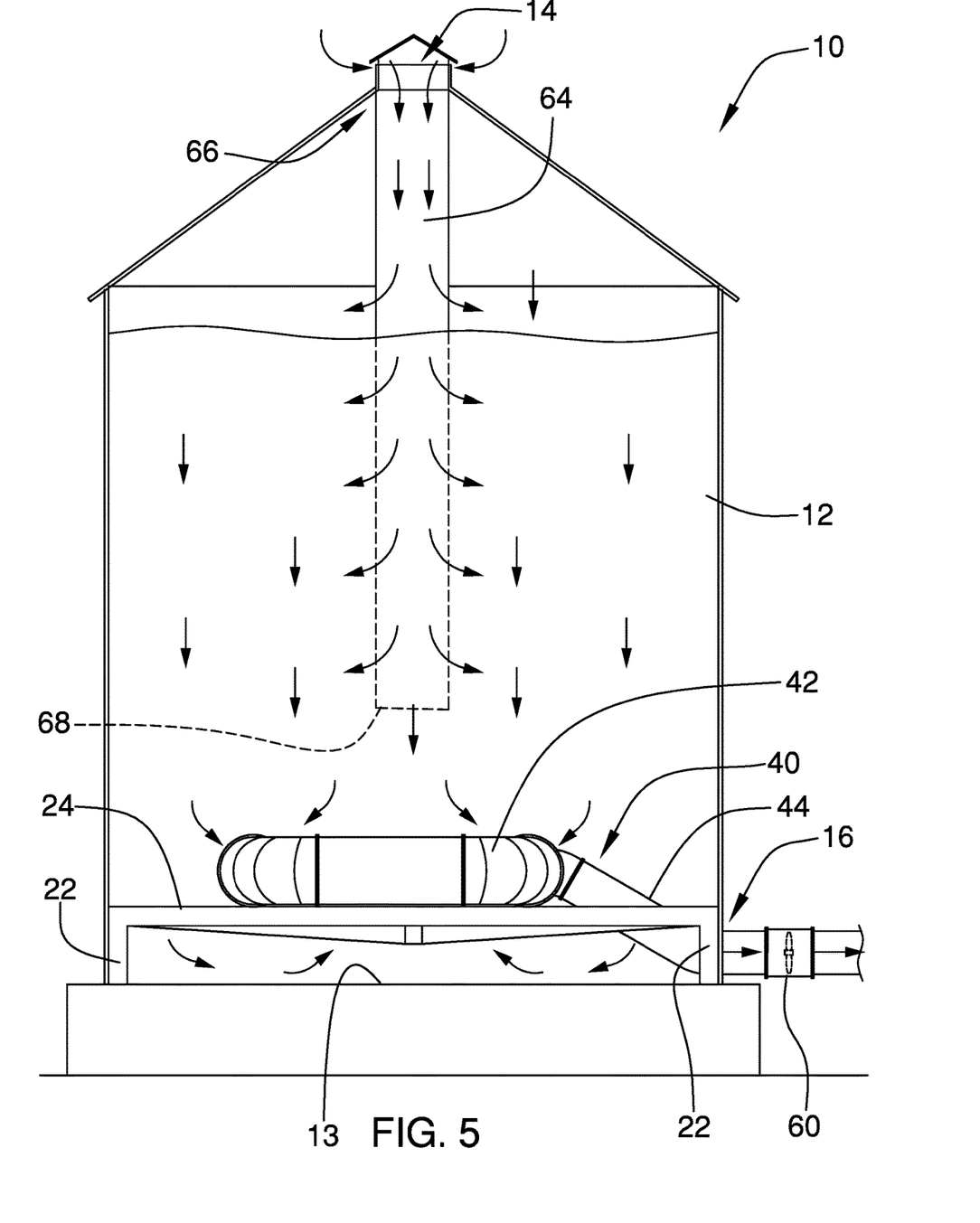
FIG. 5 is a top front side perspective view of an embodiment of the support stand of the disclosure.
Figure 6:
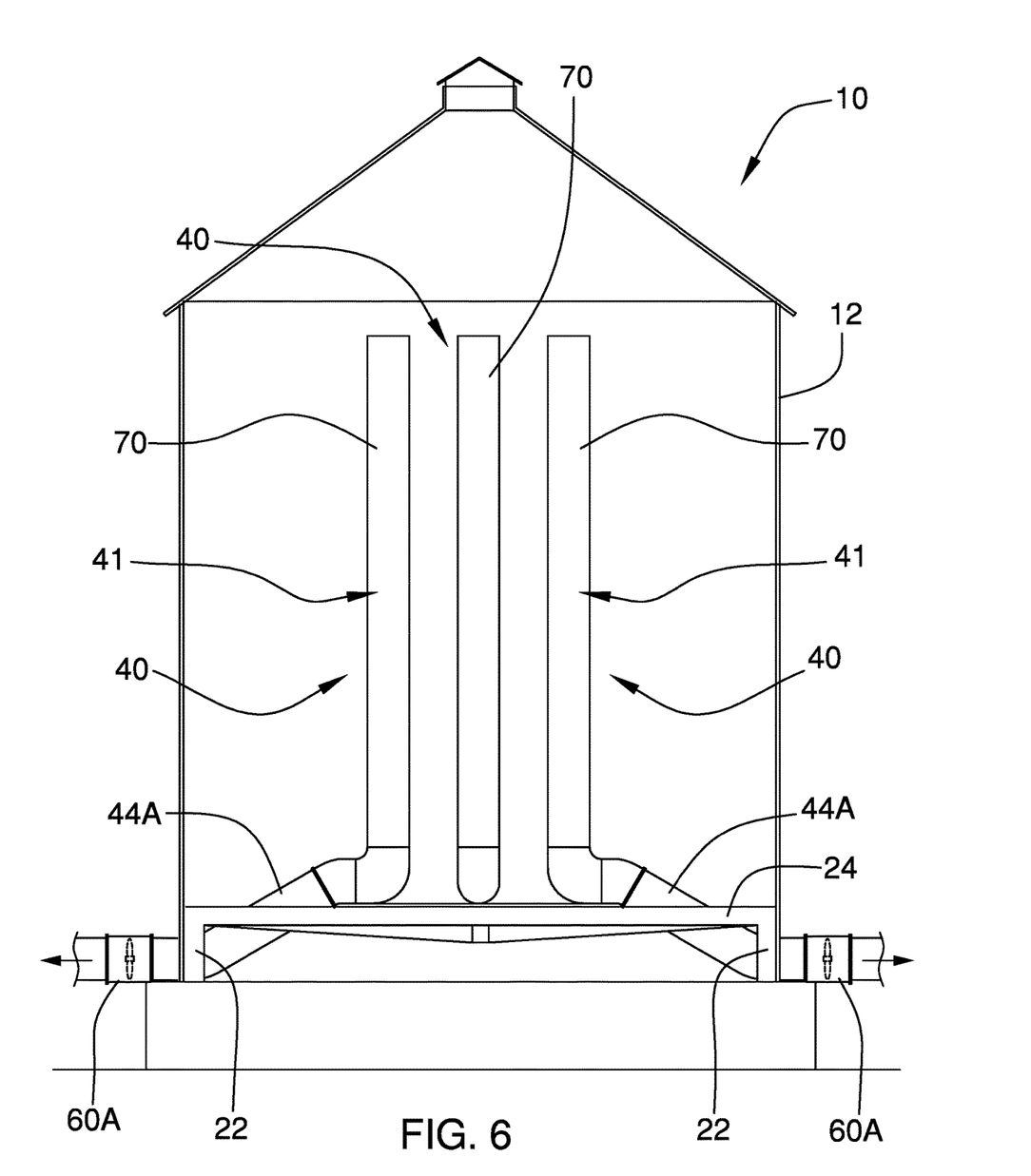
FIG. 6 is a cross-sectional view of an embodiment of the disclosure taken along line 6-6 in FIG. 5.
Figure 7:
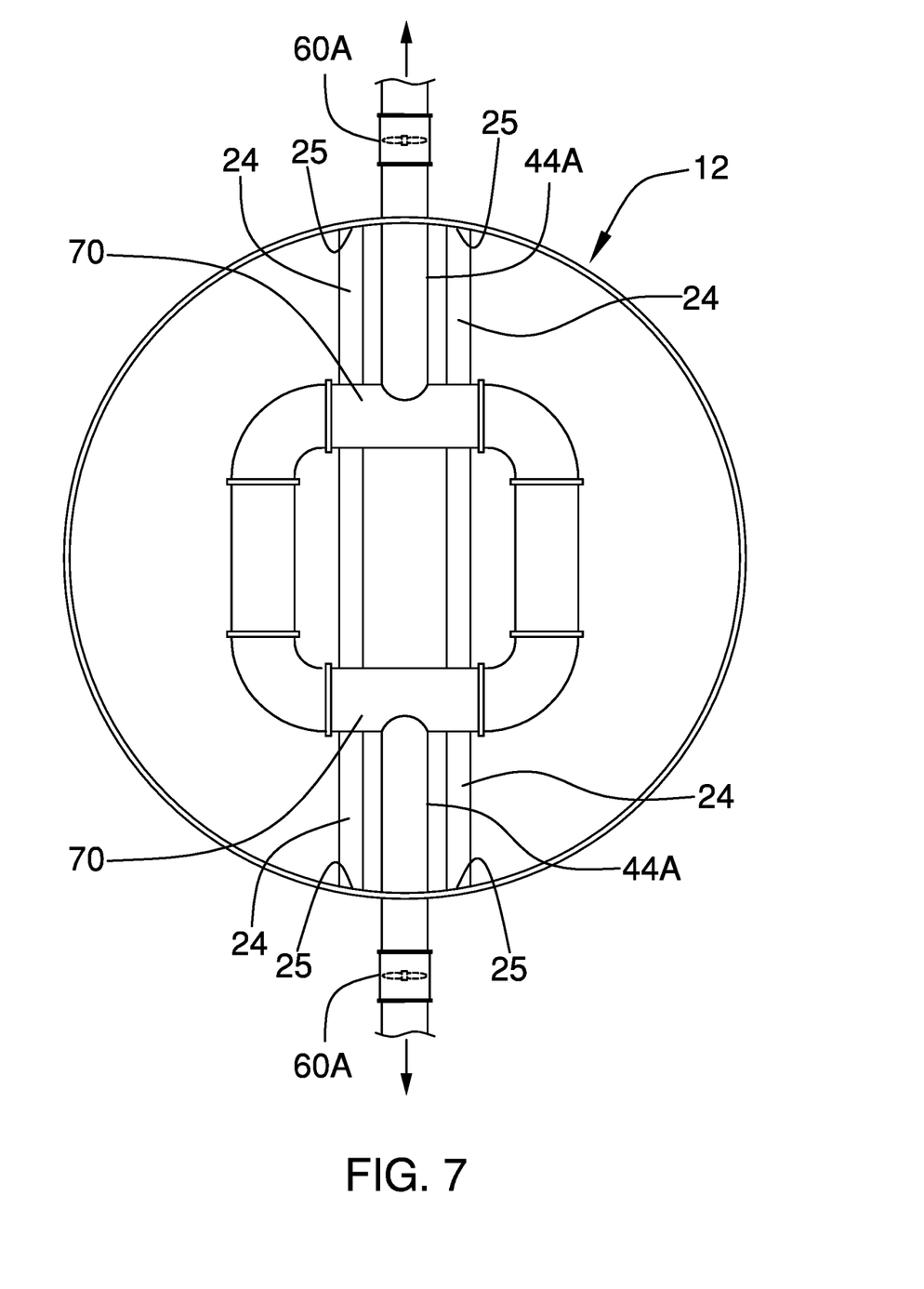
FIG. 7 is a front view of an alternative leg for the support stand of an embodiment of the disclosure in an extended position.

A duct 40 in accordance with the general disclosure of the invention includes a main section 41 supported on the stand 18 and an extension section 44 out through the bottom vent 16 in the grain bin 12. As shown throughout the drawing figures, there may be more than one extension section 44 and more than one bottom vent 16 in the grain bin 12. Additionally, as shown in FIG. 1, the bottom vent 16 may be positioned such that the extension section 44 remains horizontal. Alternatively, as shown in other drawing figures, the extension section 44 may be angled downwardly from the main section 18 if the bottom vent 16 is in a lower position on the grain bin 12. Although specifically shown only in FIG. 1, it is contemplated that the position of the bottom vent 16 may be in either position, or at any height relative to the grain bin 12, in combination with any of the other disclosed structures of the invention except where alternative positioning would be mutually exclusive to the other structure.

The main section 41 is a loop section 42 supported on the stand 18. The extension 44 extends from the loop section 42 out through the bottom vent 16 in the grain bin 12. The loop section 42 is shown as a square shape 46 having rounded corners 48. The loop section 42 may also be circular, triangular or another shape defining a central opening 50. The loop section 42 is horizontally oriented within the grain bin 12 and has a vertical height of between 10 and 50 inches which may be more specifically 24 inches. The diameter may further be outside of the stated range but may lose effectiveness or desirability due to lack of sufficient size compared to the space within the grain bin 12 when less than 10 inches and excessive diminishment of space for grain within the grain bin 12 when more than 50 inches. The loop section 42 may have a diameter of about one third the diameter of the grain bin 12. Thus, the grain bin 12 having a thirty foot interior diameter would have a ten foot diameter for the loop section. As the shape does not necessarily correspond directly to a circular loop, the proportionality is approximate such that a ten foot circle from the center of the grain bin 12 would be consistent with the positioning of the loop section 42. The duct 40 comprises a duct wall 52 and a plurality of perforations 54 extending through the duct wall 52 such that the duct 40 is configured for air to pass through the duct wall 52. The duct wall 52 has a circular cross-section having dimensions consistent with the above description. Each of the perforations 54 is sized such that the duct 40 is configured to inhibit grain from passing into the duct 40 from the grain bin 12. A center 56 of the loop section 42 is positioned concentric with a vertical central axis of the grain bin 12. The perforations 54 may be provided in the loop section 42 and a full length of the extension 44 between the loop section 42 and a peripheral wall 58 of the grain bin 12. Alternatively, the perforations 54 may be positioned either only on the loop section 42 or on the loop section 42 and partially along the extension 44.

A blower 60 is coupled to the duct 40. The blower 60 drives air flow out of the bottom vent 16 creating air flow into the grain bin 12 through the top vent 14 and into the duct 40 through the perforations 54 wherein the blower 60 is configured to aerate grain 62 positioned within the grain bin 12.

An aeration tube 64 has an upper end 66 coupled to the top vent 14 wherein the aeration tube 64 is in fluid communication with the top vent 14. The aeration tube 64 is elongated and extends down into the grain bin 12. The aeration tube 64 is centrally positioned within the grain bin 12 such that the aeration tube 64 and the grain bin 12 have a common central longitudinal axis. The aeration tube 64 is perforated similar to perforation of the duct 40 wherein the aeration tube 64 is configured for facilitating passage of airflow down into the grain bin 12 and outwardly into the grain bin 12 along a length of the aeration tube 64. The aeration tube 64 has a bottom end 68 positioned in vertically spaced relationship over and aligned with the center 56 of the loop section 42. As discussed above, the top vent 14 may not be centered within the grain bin 12. As shown in Figure X, when the top vent 14 is not centered, the upper end 66 of the aeration tube 64 may be lower than the apex of the roof structure 70 of the grain bin 12 and the aeration tube 64 may include an offset section 74 extending from the upper end 66 connecting the upper end 66 to the top vent 14. The offset section 74 may be perpendicular to or angled relative to a vertical section 76 of the aeration tube 64 but it is preferred to have the upper end 66 of the aeration tube 64 positioned above the level of grain within the grain bin 12 when the grain bin 12 is filled to capacity.

It is specifically contemplated that all structures described above or shown in the drawing figures as part of either embodiment may be included in the other embodiment or in combination to define additional embodiments except where such structures are mutually exclusive.

In use, grain is stored in the grain bin 12. The stand 18 extends through the grain bin 12 to elevate the loop section 42 of the duct 40. The positioning of the loop section 42 provides airflow through the grain bin 12 contrary to natural air flow patterns due to temperature difference between the interior of the grain bin 12 and outside of the grain bin 12. The air flow aerates and dries the grain 62 within the grain bin 12 without forming condensation zones within the grain bin 12. The legs 22 are positioned either at a periphery of the floor 13 of the grain bin 12 or just outside the grain bin 12 to allow the grain sweep 32 to move along the bottom 30 of the grain bin 12 in a radial motion without obstruction from the stand 18.

Figure 10:
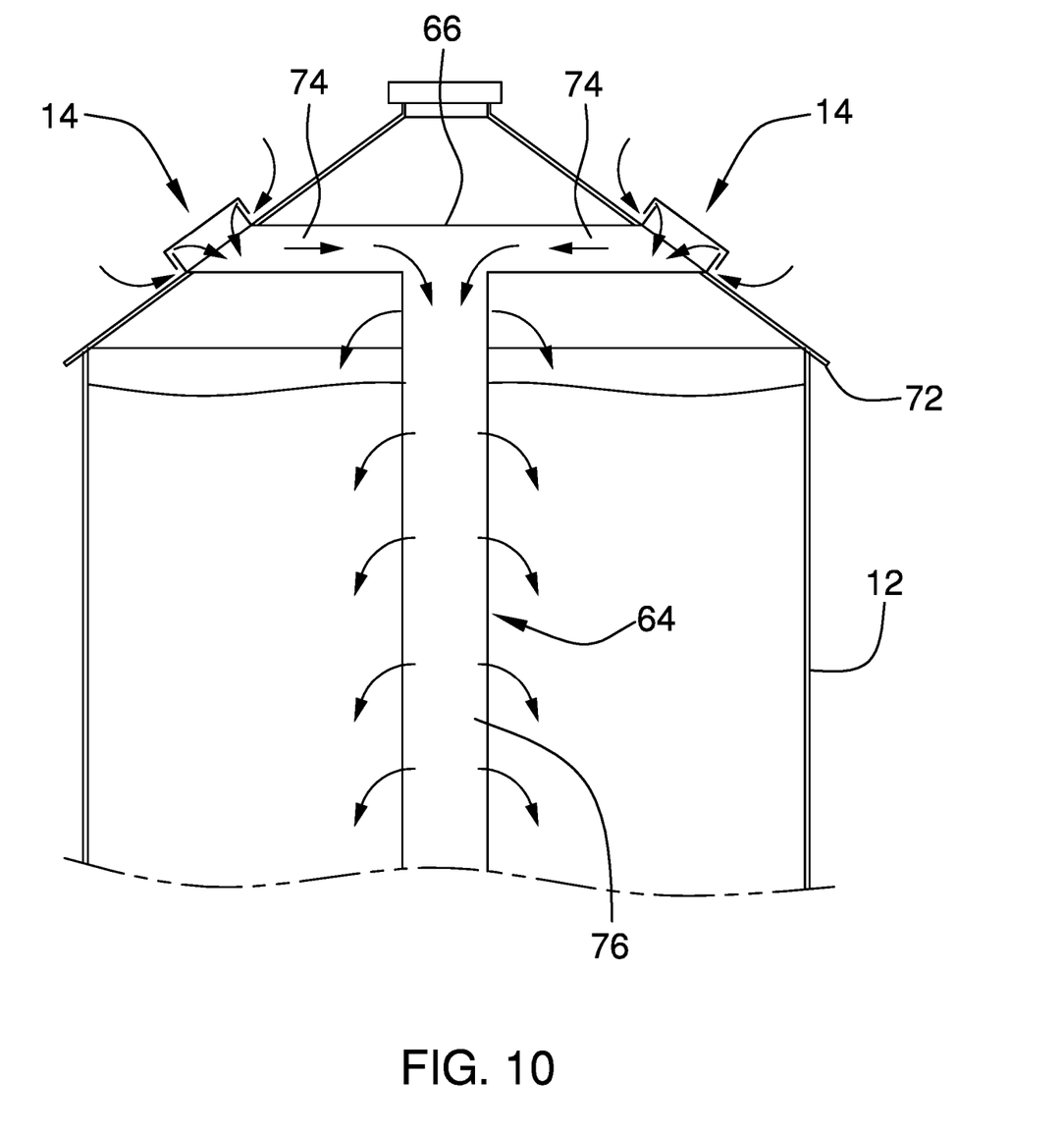
FIG. 10 is a partial front cut-away view of an alternative embodiment of the grain aeration system of the disclosure.

In an embodiment shown in FIGS. 10 and 11, the main section 41 is a column 70 extending vertically from the stand 18. This embodiment employs three ducts 40A supported on respective corners 72 of the stand 18 with each column 70 having a respective extension 44A and blower 60A. The stand 18 is positioned such that the corners 72 are arranged radially around the center of the grain bin 12 along a circumference corresponding to one third of the interior diameter of the grain bin 12. So by example, each column 70 is positioned to extend vertically ten feet from and parallel to the vertical center line of the grain bin 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A grain aeration system comprising:
a grain bin having a top vent and a bottom vent;
a stand extending through said grain bin, said stand being positioned in spaced relationship above a floor of said grain bin, said stand having legs at opposing ends of said stand, said legs being positioned at a periphery of said floor of said grain bin wherein said stand extends over and leaves unobstructed a center portion of said floor of said grain bin;
a duct, said duct having a main section supported on said stand, said duct having an extension extending from said main section out through said bottom vent in said grain bin, said duct comprising a duct wall and a plurality of perforations extending through said duct wall such that said duct is configured for air to pass through said duct wall;
a blower coupled to said duct, said blower driving air flow out of said bottom vent creating air flow into said grain bin through said top vent and into said duct wherein said blower is configured to aerate grain positioned within said grain bin.

2. The system of claim 1, further comprising said main section of said duct being a loop section supported on said stand.

3. The system of claim 2, further comprising a center of said loop section being positioned concentric with a vertical central axis of said bin.

4. The system of claim 2, further comprising said loop section being a square shape having rounded corners.

5. The system of claim 2, further comprising said loop section being horizontally oriented and having a vertical height of between 10 inches and 50 inches.

6. The system of claim 2, further comprising said duct wall having a circular cross-section having a diameter between 10 inches and 50 inches.

7. The system of claim 1, further comprising said stand being spaced between three feet and five feet above said floor of said grain bin.

8. The system of claim 1, further comprising said stand comprising a pair of parallel spaced beams, each of said beams being supported by a respective pair of said legs.

9. The system of claim 8, further comprising each of said legs having an outer surface positioned adjacent to an interior peripheral surface of said grain bin.

10. The system of claim 8, further comprising said extension of said duct being positioned parallel and between said beams.

11. A grain aeration system comprising:
a grain bin having a top vent and a bottom vent;
a stand extending through said grain bin, said stand being positioned in spaced relationship above a floor of said grain bin, said stand having legs at opposing ends of said stand, said stand extending through said grain bin such that said legs are positioned outside of an interior of said grain bin wherein said stand is supported over and leaves unobstructed a full extent of said floor of said grain bin;
a duct, said duct having a main section supported on said stand, said duct having an extension extending from said main section out through said bottom vent in said grain bin, said duct comprising a duct wall and a plurality of perforations extending through said duct wall such that said duct is configured for air to pass through said duct wall;
a blower coupled to said duct, said blower driving air flow out of said bottom vent creating air flow into said grain bin through said top vent and into said duct wherein said blower is configured to aerate grain positioned within said grain bin.

12. The system of claim 11, further comprising said main section of said duct being a loop section supported on said stand.

13. The system of claim 12, further comprising a center of said loop section being positioned concentric with a vertical central axis of said bin.

14. The system of claim 12, further comprising said loop section being a square shape having rounded corners.

15. The system of claim 12, further comprising said loop section being horizontally oriented and having a vertical height of between 10 inches and 50 inches.

16. The system of claim 12, further comprising said duct wall having a circular cross-section having a diameter between 10 inches and 50 inches.

17. The system of claim 12, further comprising said stand being spaced between three feet and five feet above said floor of said grain bin.

18. The system of claim 11, further comprising said stand comprising a pair of parallel spaced beams, each of said beams being supported by a respective pair of said legs.

19. The system of claim 18, further comprising each of said legs having an outer surface positioned adjacent to an interior peripheral surface of said grain bin.

20. The system of claim 18, further comprising said extension of said duct being positioned parallel and between said beams.

* * * * *